United States Patent [19]

Brister

[11] 4,416,118
[45] Nov. 22, 1983

[54] METHOD AND APPARATUS FOR CONTROLLING THE FORMATION OF A TEMPORARY PLUG IN A FLUID TRANSMISSION LINE

[76] Inventor: Beryle D. Brister, P.O. Box 9272, Amarillo, Tex. 79105

[21] Appl. No.: 332,231

[22] Filed: Dec. 21, 1981

[51] Int. Cl.³ .............................................. F25C 1/00
[52] U.S. Cl. .......................................... 62/66; 62/293
[58] Field of Search ....................... 62/66, 293, 514; 138/97, 99; 285/41

[56] References Cited

U.S. PATENT DOCUMENTS

| | | | |
|---|---|---|---|
| 3,742,723 | 7/1973 | Grise | 62/293 X |
| 3,926,006 | 12/1975 | Brooks et al. | 62/293 X |
| 4,112,706 | 9/1978 | Brister | 62/293 X |
| 4,220,012 | 9/1980 | Brister | 62/293 X |
| 4,267,699 | 5/1981 | Bahrenburg | 62/293 X |

*Primary Examiner*—Lloyd L. King

*Attorney, Agent, or Firm*—Hubbard, Thurman, Turner & Tucker

[57] ABSTRACT

Temporary plugs are formed in fluid transmission lines by circulating cryogenic fluid through a housing disposed on the exterior of the line to freeze a slug of liquid within the interior of the line. Flow of cryogenic fluid is controlled by sensing the temperature on the surface of the line and sensing the temperature in a housing vent line to indicate a predetermined maximum level of liquid. A temperature sensing and control apparatus is provided which includes dual temperature signal receiving and comparator circuits for operating control valves to open and close at minimum and maximum temperature set points. The control circuitry is operable to open and close the cryogenic fluid control valve in response to variation of the sensed temperature above or below the limit temperatures and in response to a change in temperature indicating an excess level of liquid cryogenic fluid in the chamber formed around the transmission line.

8 Claims, 3 Drawing Figures

METHOD AND APPARATUS FOR CONTROLLING THE FORMATION OF A TEMPORARY PLUG IN A FLUID TRANSMISSION LINE

BACKGROUND OF THE INVENTION

1. Field of the Invention

This invention pertains to a temperature control system for controlling the flow of a cryogenic fluid to a housing disposed around a fluid transmission line to control the formation and maintenance of an ice plug within the interior of the transmission line in connection with installation, testing, modification or repair of the line.

2. Background Art

In the installation, testing and modification of relatively large diameter fluid transmission lines, a unique process has been developed for forming temporary plugs in the line to permit pressure testing, as well as to prevent loss of fluid from or ingress of fluid into the line during installation and repair thereof. U.S. Pat. Nos. 3,827,282; 4,112,706 and 4,220,012 to B. D. Brister pertain to various inventions related to the formation of a plug by freezing a quantity of liquid at a predetermined location within a fluid transmission line. The inventive concept disclosed in the aforementioned patents basically comprise the provision of a housing disposed around the exterior of the transmission line and forming a closed chamber through which a cryogenic fluid is circulated to freeze the slug of liquid within the interior of the transmission line itself in the immediate vicinity of the housing. The liquid to be frozen may be the liquid being transmitted by the line or a slug of easily frozen liquid, such as water, may be introduced into the line between two spaced apart pipeline pigs and pumped to the point at which the plug is to be formed. Other methods include the provision of a pipeline pig having a sealed chamber filled with liquid which expands on freezing to form the temporary seal at the predetermined point in the line.

It is important, in the formation of temporary plugs in fluid transmission lines in the manner described, that careful monitoring of the temperature of the line and the fluid conditions within the cryogenic fluid housing be maintained during the time that the plug is being formed and maintained. Premature thawing of a temporary plug of the type described above could produce catastrophic results if, for example, the plug was formed to retain a volatile or environmentally damaging fluid within the line during the rapir or modification process. Accordingly, it has become desirable and necessary to provide means for remote control and monitoring of the temperature of the line exterior surface, which temperature is indicative of the condition of the frozen plug within the line during the repair or modification process. the flow of cryogenic fluid to the aforementioned housing during the formation and maintenance of the temporary plug to efficiently utilize the cryogenic fluid and prevent excessive consumption of fluid in the formation and maintenance of the plug.

SUMMARY OF THE INVENTION

The present invention pertains to an improved method for monitoring the formation of a temporary plug for a fluid transmission line which plug is formed by freezing a slug of liquid within the interior of the transmission line by circulating a cryogenic fluid through a chamber formed by a housing disposed on the exterior of the line. The improved method includes monitoring the temperature on the exterior surface of the line and circulating cryogenic fluid in response to changes in the line surface temperature. In accordance with an important aspect of the present invention, there is provided a temperature monitoring and fluid flow control unit including temperature sensor means for sensing the exterior surface temperature of the transmission line and controlling the flow of cryogenic fluid to a chamber formed by a housing disposed around the exterior of the line. The temperature sensor unit is adapted to receive signals from two separate temperature sensors which may be placed at respective ones of fluid circulation housings for forming two separate plugs spaced apart along the transmission line.

Alternatively, the temperature sensor unit may be arranged to sense the temperature on the exterior surface of the transmission line in the vicinity of the plug and to sense the temperature in a vent conduit on the cryogenic fluid housing for controlling the flow of fluid to prevent excess flow of liquid through the housing. Accordingly, temperature sensor apparatus may be utilized to control the flow of cryogenic fluid through a particular housing to provide more efficient and rapid formation of the temporary plug, and when conservation of the cryogenic fluid being circulated is desired.

The temperature sensor apparatus of the present invention includes dual temperature indicating meters operable, respectively, to provide a signal to separate comparator circuits wherein each comparator circuit is adapted to receive a preset signal from suitable sets of switches and to provide an output signal for operating a fluid flow control valve when the temperature sensed exceeds predetermined maximum and minimum values. The comparator circuits provide an output signal to separate logic control circuits to control the operation of a flow control valve for the cryogenic fluid. The logic control circuit associated with each control valve is also adapted to receive a signal from the other comparator circuit to effect operation of the control valve. Accordingly, the apparatus of the present invention may be utilized to monitor temperatures associated with two separate ice plugs and control the flow of cryogenic fluid through separate housings in accordance with the temperatures sensed. The temperature sensing and control apparatus may also be utilized to sense the temperature at two different locations within a cryogenic fluid housing to more accurately control and monitor the flow of cryogenic fluid.

Those skilled in the art will further appreciate the superior features and advantages of the method and apparatus of the present invention upon reading the detailed description which follows.

DESCRIPTION OF THE PREFERRED EMBODIMENTS

Figure 1:
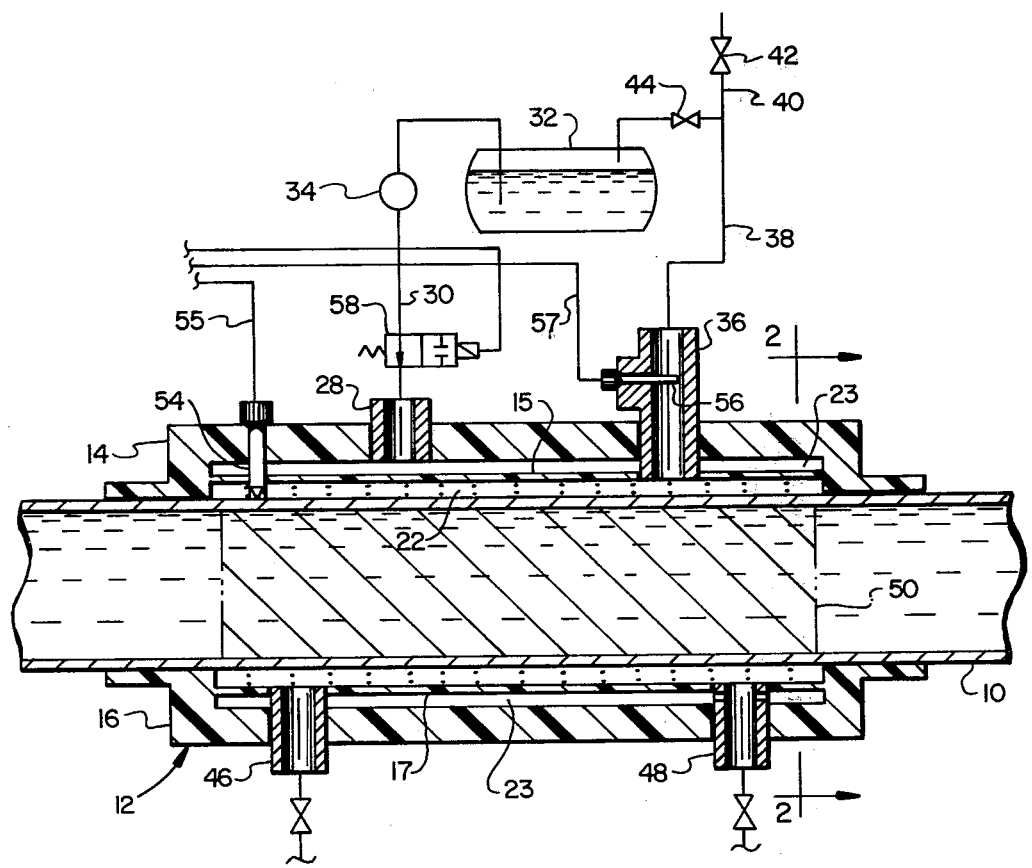
FIG. 1 is a side elevation, in section, of a portion of a fluid transmission pipeline including a cryogenic fluid circulation housing disposed therearound.

The present invention pertains to improvements in processes for forming temporary plugs in fluid transmission lines, which processes and improvements thereon, as well as associated apparatus, are disclosed in the aforementioned patents incorporated herein by reference. Referring to FIG. 1, there is illustrated a section of a relatively large diameter fluid transmission line 10. Typically, such lines range in diameter from about 8 inches to 48 inches and are used to transport petroleum products and other chemicals over relatively long distances. In the installation, pressure testing, modification and repair of transmission lines, it is often necessary to plug the line at a predetermined location to prevent loss of fluid from the interior of the line or, for example, in submarine applications, to prevent sea water from entering the line. The importance of being able to form a temporary plug in a transmission line is underscored by considering, for example, that if a long distance crude oil transmission line is damaged or requires modification, without the ability to form a plug in the line at a predetermined location adjacent to the point of repair or modification, it would be necessary to empty the line of its contents. Such an emptying process might require the pumping of fluid out of a section of line several miles long. In this regard, the process and apparatus disclosed and claimed in the aforementioned patents to B. D. Brister provides for improvements in the formation of temporary plugs by freezing a slug of liquid in the transmission line utilizing either the line product or a quantity of easily frozen liquid such as water introduced into the line and moved through the line to a predetermined location. Quite often it is, of course, necessary to form two plugs spaced from each other on opposite sides of the point wherein the line has been damaged or modification is required.

Figure 2:
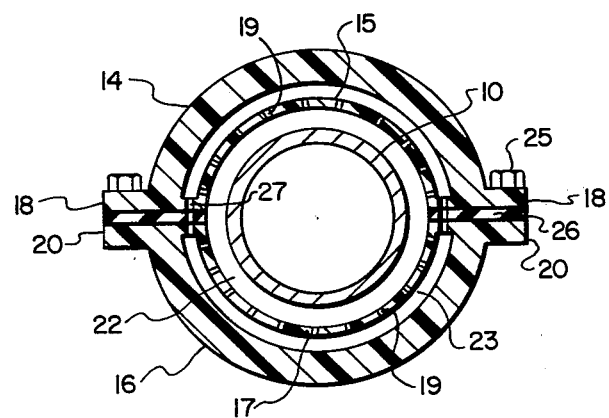
FIG. 2 is a section view taken along the line 2—2 of FIG. 1.

FIGS. 1 and 2 illustrate a housing disposed around the exterior of the transmission line 10, and designated by the numeral 12. The housing 12 is formed of two cylindrical half sections 14 and 16 which are provided with suitable flanges 18 and 20 whereby the housing sections may be bolted together to form a closed annular chamber 22 around the exterior of the line. The chamber 22 is formed, in part, by respective internal manifold portions 15 and 17 of the housing sections 14 and 16. The manifold portions 15 and 17 include a series of spaced apart orifices 19 formed therein to place the chamber 22 in communication with a fluid distribution chamber 23 formed by the manifold portions and the interior walls of the housing sections 14 and 16. As illustrated in FIG. 2, the housing sections 14 and 16 are secured together along the flanges 18 and 20 by a series of bolts 25 and may be provided with suitable gasket means 26. Communication between the upper and lower portions of the chamber 23 may be provided by a series of passages 27.

The housing 12 is provided with a fluid inlet conduit 28 which is adapted to be in communication with a conduit 30 leading to the housing from a fluid reservoir 32. A pump 34 is typically provided in the conduit 30 for pumping cryogenic fluid into the chamber 23 for distribution uniformly throughout the chamber 22 whereby the fluid comes into direct contact with the exterior surface of the transmission line 10. The housing 12 is also provided with a vent conduit portion 36 which is in direct communication with the chamber 22 and with a fluid vent or return line 38 leading to the reservoir 32 and having a branch 40 for venting fluid vapor directly to atmosphere. Suitable valves 42 and 44 are provided in the respective conduits 38 and 40 for controlling the return flow of fluid from the housing 12. The housing 12 may also be provided conduit portions 46 and 48 which are in communication with the interior chambers of the housing. The conduit portion 46 may be suitably coupled in circuit with the conduit 38 for recirculation of cryogenic fluid and the conduit portion 48 may be provided for certain applications of the housing 10 to purge the chambers 22 and 23 of fluid, such as water, for example, when the housing is installed on a submarine transmission line.

In accordance with the teaching of the aforementioned patents, cryogenic fluid such as liquid nitrogen is circulated through the chamber 22 to freeze a slug of liquid within the interior of the transmission line 10 to form a solid fluid tight plug such as the plug generally designated by the numeral 50 in FIG. 1. The plug 50 may be formed using the pipeline fluid or product itself if such fluid is relatively easily frozen by the circulation of a low temperature fluid such as liquid nitrogen around the exterior of the line. Alternatively, an easily frozen liquid such as water may be introduced into the line and transported to the predetermined position for formation of the plug 50. Those skilled in the art will appreciate from the foregoing description and from the references referred to herein, that two or more housings 12 may be installed at predetermined locations along a transmission line to provide spaced apart plugs such as the plug 50 for various operations on a line such as pressure testing of sections of line between plugs, or for installation, modification or repair of a section of line between plugs. It is not uncommon for the distance between the temporary plugs to be several hundred feet or more apart.

It is desirable to be able to monitor the formation and maintenance of a plug by sensing the temperature on the exterior surface of the line in the vicinity of the plug and to monitor the flow of cryogenic fluid through the interior of the housing 12. In particular, monitoring of the surface temperature on the exterior of the transmission line will indicate that a sufficiently low temperature is being maintained to keep the plug completely frozen. Moreover, monitoring of the flow of cryogenic liquid out through the vent conduit such as the conduit 36, is desirable to prevent the pumping of excess amounts of liquid through the housing 12 which can reduce the efficiency of heat transfer to the fluid from the line and can be wasteful of the fluid if it is not being recirculated back to a reservoir. An effective method of monitoring the flow of liquid is by sensing the temperature in the vent conduit 36. If the cryogenic fluid is being recirculated back to the reservoir in liquid form, then an excessive flow rate of liquid is being experienced and the flow of liquid from the reservoir 32 to the interior chambers of the housing 12 should be reduced or temporarily interrupted.

The present invention contemplates an improved method for monitoring the conditions associated with the formation of a plug in a fluid transmission line of the aforementioned type by providing a temperature sensor 54 which is adapted to be in direct contact with the exterior surface of the line 10, as illustrated in FIG. 1. A second temperature sensor 56 is also desirably provided interposed in the fluid vent or return conduit 36, as illustrated in FIG. 1. The temperature sensors 54 and 56 may be one of several types but typically would comprise thermocouples adapted to provide electrical signals through conductors 55 and 57, respectively, which signals would be relative to the temperature sensed at the location of the respective sensors. The temperature sensors 54 and 56 may comprise other types of electrical pyrometers capable of producing an electrical signal proportional to the temperature sensed. Control of the flow of cryogenic fluid to the interior chambers of the housing 12 may also be suitably provided by a solenoid operated valve 58 which is operated by an improved control apparatus in accordance with the present invention and which will be described hereafter in conjunction with FIG. 3 of the drawings.

Figure 3:
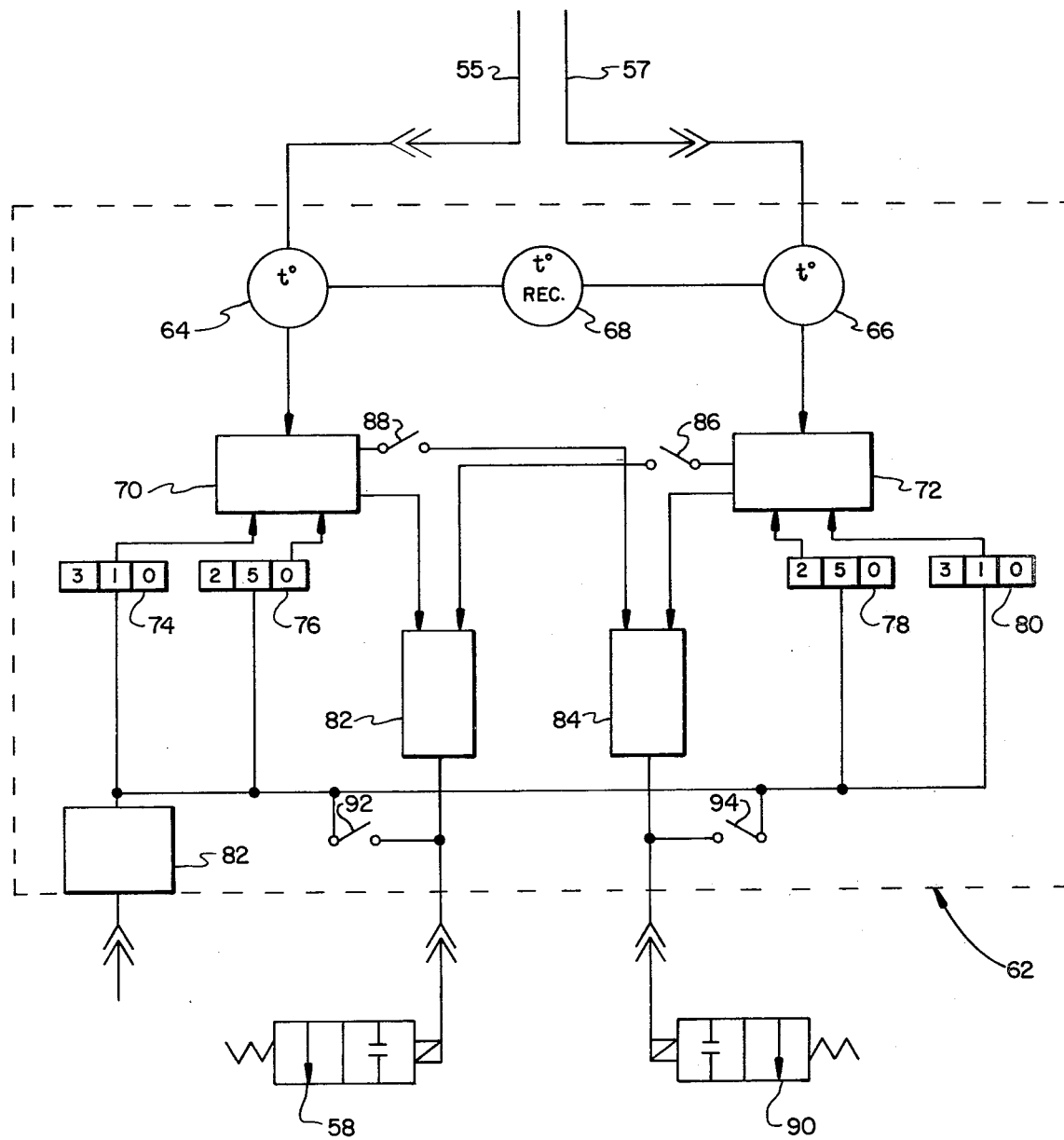
FIG. 3 is a schematic diagram of a recording and control apparatus in accordance with the present invention.

Referring now to FIG. 3, there is illustrated in schematic form an apparatus for monitoring the temperature sensed by the sensors 54 and 56, for example, and for controlling operation of the valve 58. The apparatus in FIG. 3 is generally designated by the numeral 62 and includes a pair of temperature meters 67 and 66 which may be of the digital display type. The meters 64 and 66 are arranged to provide a digital display of the temperatures sensed by the thermocouples 54 and 56, respectively, and also provide an input signal to a recording type temperature meter 68. The apparatus 62 also includes a pair of electrical comparator circuits 70 and 72 which are respectively adapted to receive input signals from the temperature meters 64 and 66. The comparator circuit 70 is also adapted to receive signals of preset magnitude from circuits 74 and 76 which include thumbwheel type selector switches or the like which are provided for presetting a minimum limit temperature and a maximum limit temperature, respectively. In a similar manner, the comparator circuit 72 is adapted to receive signals of preset magnitude from circuits 78 and 80 which also include suitable thumbwheel switches or the like for presetting respective maximum limit temperatures and minimum limit temperatures. The circuits 70 through 80 are also suitably connected to a power supply 82 to provide a 12 volt dc voltage input.

The control apparatus 62 is further characterized by two logic gate and amplifier circuits designated by the numerals 82 and 84. When, for example, the comparator circuit 70 has received a temperature signal from the meter 64 indicating a temperature less than −310° F., a signal is imposed on the circuit 82 to cause the solenoid valve 58 to shift to the closed position. Similarly, when a temperature signal is received by the circuit 70 indicating a temperature greater than −250° F., a signal is transmitted to the circuit 82 to open the valve 58 to effect resumption of flow of cryogenic fluid through the chambers 22–23. The circuit 82 is also arranged to receive a signal from the comparator circuit 72 when a switch 86 is in the closed position. Accordingly, the comparator circuit 72 may be utilized to provide an input signal to the circuit 82 when a predetermined temperature is sensed by the temperature sensor 56. In like manner, the circuit 70 is adapted to provide a suitable signal to a logic and amplifier circuit 84 when a switch 88 is in the closed position.

The logic and amplifier circuit 84 is similar to the circuit 82 and is arranged to provide an output signal to a solenoid valve 90 for controlling the flow of cryogenic fluid to a second housing, not shown, which may be placed along the transmission line spaced apart from the housing 12. The circuit 84 may be conditioned to open the valve 90 when the comparator circuit receives a temperature signal indicating a temperature greater than −250° F. at a temperature sensor associated with the meter 66. The comparator circuit 72 may be operated to condition the circuit 84 to close the valve 90 when, for example, a signal is received from meter 66 including a temperature less than −310° F. The apparatus 62 is also preferably provided with manual override switches 92 and 94 for operating the valves 58 and 90 independent of the control circuitry. The valves 58 and 90 may be replaced by progressive throttling type control valves instead of the on-off type illustrated. Moreover, the circuitry could be modified to actuate such progressive throttling type valves.

The apparatus 62 may be operated to control the flow of cryogenic fluid to two separate housings such as the housing 12 spaced apart along a transmission line to form and maintain two separate ice plugs. By connecting each of the temperature meters 64 and 66 to respective temperature sensors arranged to sense the temperature at preselected pointss on the surface of the transmission line, control of flow of fluid to respective housings may be obtained from a remote location and continuous monitoring of the temperature at a single location is also realized. The comparator circuits 70 and 72 together with the control circuits 82 and 84 automatically operate the valves 58 and 90 to maintain the sensed temperatures at the respective locations within the preset range as determined by the circuit sections 74, 76, 78 and 80.

The apparatus 62 may, alternatively, be operated to control the flow of cryogenic fluid through a housing such as the housing 12 by connecting one of the temperature meters 64 to the temperature sensor 54, by example, and connecting the temperature sensor 56 to the meter 66. With the switch 86 closed, the comparator circuit 72 is also operable to provide an input signal to the control circuit 82 so that the valve 58 is controlled not only to maintain the temperature on the surface of the transmission line 10 within a preselected range, but also to control operation of the valve to prevent excess flow of liquid cryogenic fluid through the housing 12. Since the presence of liquid cryogenic fluid in the conduit 36 and in contact with the sensor 56 would indicate a lower temperature than the presence of vapor only being vented through the conduit 38, by sensing a change in the temperature of the sensor 56, the circuit 82 may be operated to override any signal condition provided by the circuit 70 to effect opening and closing of the valve 58. In a similar manner, the circuit 84 may be adapted to receive a signal from the comparator circuit 70 with the switch 88 in the closed position for controlling the valve 90 in response to a signal from a temperature sensor which is also placed in a position to sense high liquid level or the temperature at a position which is critical to the operation of forming and maintaining the plug 50.

Those skilled in the art will appreciate that the method and apparatus of the present invention may take various forms and be subjected to various modifications without departing from the scope and spirit of the invention as defined in the appended claims.

What is claimed is:

1. A method for controlling the formation of a temporary plug in a fluid transmission line, said plug comprising a quantity of liquid disposed within the interior of said transmission line and frozen by circulating a cryogenic fluid through a chamber formed by a housing disposed around the exterior of said transmission line;

providing a housing disposed around the exterior of said transmission line and forming a chamber delimited at least in part by the exterior surface of said transmission line, said housing including a fluid inlet conduit and a fluid vent conduit;

providing a first temperature sensor at a point above said surface of said transmission line delimiting said chamber and in the flow path of said cryogenic fluid through said chamber below which point the level of liquid cryogenic fluid is to be limited;

circulating a cryogenic fluid through said chamber and venting fluid vapor from said chamber through said vent conduit;

sensing a change in temperature at said point in said flow path; and throttling the flow of cryogenic fluid to said chamber when the sensed temperature indicates the presence of liquid cryogenic fluid at said point in said flow path.

2. The method set forth in claim 1 together with the steps of:

providing a second temperature sensor positioned for measuring the temperature of the exterior surface of said transmission line in the vicinity of said plug; and controlling the flow of cryogenic fluid to said chamber in accordance with a change in the temperature sensed by said second sensor from a predetermined minimum to a predetermined maximum limit temperature.

3. Apparatus for controlling the flow of cryogenic fluid to a chamber formed by means disposed around the exterior surface of a fluid transmission line for forming and maintaining a temporary plug in the interior of said transmission line, said plug comprising a quantity of liquid frozen by circulating said cryogenic fluid through said chamber, said apparatus comprising:

first means for receiving an electrical signal from a first temperature sensor disposed to sense the temperature on the exterior surface of said transmission line;

a first comparator circuit for measuring said signal and comparing said signal with preset maximum and minimum limit temperature signals imposed on said comparator circuit; and a first control circuit for receiving a signal generated by said first comparator circuit for actuating a flow control valve to shut off the flow of cryogenic fluid to said chamber at said preset minimum temperature and resume the flow of cryogenic fluid to said chamber at said preset maximum temperature.

4. The apparatus set forth in claim 3 wherein:

said apparatus includes second means for receiving an electrical signal from a second temperature sensor disposed so as to sense a predetermined level of liquid cryogenic fluid in said chamber; and means for generating a signal to cause said control circuit to actuate said flow control valve to shut off the flow of cryogenic fluid to said chamber when the liquid in said chamber reaches said predetermined level.

5. The apparatus set forth in claim 4 wherein:

said apparatus includes a second comparator circuit for measuring said signal from said second temperature sensor and comparing said signal from said second sensor with preset maximum and minimum limit temperature reference signals imposed on said second comparator circuit; and a second control circuit for receiving a signal generated by said second comparator circuit for actuating a flow control valve in response to signals from said second sensor corresponding to said reference signals.

6. The apparatus set forth in claim 5 wherein:

said apparatus includes switch means for selectively connecting said second comparator circuit with said first control circuit for conducting a signal from said second comparator circuit to actuate said flow control valve.

7. The apparatus set forth in claim 4 in combination with:

a housing forming said chamber, said housing including fluid inlet conduit means and fluid vent conduit means, said first temperature sensor is disposed on said housing and extends into said chamber and in contact with the surface of said transmission line, and said second temperature sensor is disposed on said housing and extends into said vent conduit means.

8. A method for controlling the formation of a temporary plug in a fluid transmission line, said plug comprising a quantity of liquid disposed within the interior of said transmission line and frozen by circulating a cryogenic fluid through a chamber formed by a housing disposed around the exterior of said transmission line;

providing a housing disposed around the exterior of said transmission line and forming a chamber delimited at least in part by the exterior surface of said transmission line, said housing including a fluid inlet conduit and a fluid vent conduit;

providing a first temperature sensor at a point in the flow path of said cryogenic fluid through said chamber below which the level of liquid cryogenic fluid is to be limited;

providing a second temperature sensor positioned for measuring the temperature of the exterior surface of said transmission line in the vicinity of said plug;

providing a controller including a control circuit having means for presetting maximum and minimum limit temperatures;

circulating a cryogenic fluid through said chamber and venting fluid vapor from said chamber through said vent conduit;

sensing a change in temperature at said point in said flow path;

throttling the flow of cryogenic fluid to said chamber when the sensed temperature indicates the presence of liquid at said point in said flow path;

comparing the temperature sensed by said second sensor with said preset limit temperatures;

shutting off the flow of cryogenic fluid to said chamber at said preset minimum limit temperature; and resuming the flow of cryogenic fluid to said chamber at said preset maximum limit temperature.

* * * * *